United States Patent
Leydecker et al.

(12) 
(10) Patent No.: US 6,284,328 B1
(45) Date of Patent: Sep. 4, 2001

(54) PROCESS FOR PRODUCING ADHESIVE TAPES, IN WHICH ADHESIVE TAPES COATED ON ONE SIDE WITH AN ADHESIVE COMPOSITION ARE SUBJECTED TO RADIATION CROSSLINKING

(75) Inventors: Heiko Leydecker, Neustadt/Holstein; Manfred Spies, Biedenkopf; Hermann Neuhaus-Steinmetz, Ahrensburg, all of (DE)

(73) Assignee: Beiersdorf AG, Hamburg (DE)

( * ) Notice: Subject to any disclaimer, the term of this patent is extended or adjusted under 35 U.S.C. 154(b) by 0 days.

(21) Appl. No.: 09/409,199

(22) Filed: Sep. 30, 1999

(30) Foreign Application Priority Data

Oct. 12, 1998 (DE) ............................................... 198 46 901

(51) Int. Cl.$^7$ ....................................................... C08J 2/46
(52) U.S. Cl. .................. 427/496; 427/207.1; 427/208.2; 427/208.4; 427/389.9; 427/393.5; 427/394; 427/501; 427/505; 427/513; 427/516; 427/551; 427/558; 427/559
(58) Field of Search ..................................... 427/496, 501, 427/505, 513, 516, 551, 558, 559, 208.4, 208.2, 207.1, 389.9, 393.5, 394

(56) References Cited

U.S. PATENT DOCUMENTS 5,407,726 * 4/1995 Serra et al. .

5,804,510   9/1998 Spies et al. .

FOREIGN PATENT DOCUMENTS

| 36 36 396 A1 | 4/1988 | (DE) . |
| 43 25 932 A1 | 3/1994 | (DE) . |
| 42 43 270 A1 | 6/1994 | (DE) . |
| 44 19 169 A1 | 12/1997 | (DE) . |
| 0 068 696 A2 | 6/1982 | (EP) . |
| 0 416 921 A1 | 9/1990 | (EP) . |
| 0 453 254 A2 | 4/1991 | (EP) . |
| 56 131682 A | 10/1981 | (JP) . |
| 88/01281 | 2/1988 | (WO) . |
| 91/04151 | 4/1991 | (WO) . |
| 98/38262 | 9/1998 | (WO) . |

OTHER PUBLICATIONS

Derwent Abstract, Ref. 95–049077/07 zu JP 06330003–A, May 20, 1993.

* cited by examiner

*Primary Examiner*—Bernard Pianalto
(74) *Attorney, Agent, or Firm*—Norris McLaughlin & Marcus

(57) ABSTRACT

Process for producing adhesive tapes in which adhesive tapes coated on one side with an adhesive composition are subjected to radiation crosslinking, the irradiation of the adhesive tape taking place through the backing material of the adhesive tape onto the adhesive composition in such a way that the backing material and that side of the adhesive composition facing the backing material receive a dose of from 30 to 200 kGy, in particular 100 kGy, and the acceleration voltage during the irradiation being chosen such that the dose on the open side of the adhesive composition has fallen from 0 to 60 kGy, in particular from 10 to 20 kGy.

6 Claims, No Drawings

PROCESS FOR PRODUCING ADHESIVE TAPES, IN WHICH ADHESIVE TAPES COATED ON ONE SIDE WITH AN ADHESIVE COMPOSITION ARE SUBJECTED TO RADIATION CROSSLINKING

The invention relates to a process for producing adhesive tapes, in which adhesive tapes coated on one side with an adhesive composition are subjected to radiation crosslinking, and to their use.

It is known that, especially in the case of acrylates, the establishment of specific adhesion properties requires a crosslinking step. With rubbers, too, an improvement in adhesive performance, especially in respect of the cohesion, is achieved by crosslinking.

It is also known that, as the degree of crosslinking rises, the solubility of rubbers and acrylates in organic solvents is reduced.

However, the improvement in cohesion and solvent resistance following electron beam crosslinking (EB crosslinking) is frequently associated with a drastic reduction in bond strength and tack.

In the case of product developments, especially woven adhesive tapes, where solvent resistance is, a requirement in addition to acceptable bond strengths and unwind forces, this leads to considerable problems, to which to date there has been no satisfactory solution.

In the preparation of adhesive tapes, the use of radiation crosslinking, such as UV or EBC, suggests itself in addition to chemical/thermal crosslinking methods.

The dose/depth profile in a product irradiated on an electron beam unit is known for given acceleration voltages. Various authors have developed empirical functions to describe this profile (see, for example, Heger, beta-gamma 1, 20,1990 or Neuhaus-Steinmetz, RadTech Europe, Mediterraneo, 1993).

A basis used for the calculation of the radiation dose is, for example, the following empirical formula, which was published by Neuhaus-Steinmetz at RadTech Europe, Mediterraneo 1993.

$$D[\%] = \frac{\exp\left\{-\left(\frac{18.8 * X}{(U_B)^{1.57}} - 0.7\right)^2\right\}}{1 + \left(\frac{9.7 * X}{(U_B)^{1.57}}\right)^{15}}$$

where

D is the dose in %

$U_B$ is the acceleration voltage in kV

X is the irradiated weight per unit area in g/m², consisting of the weight per unit area of the vacuum window, the air gap between vacuum window and product, and the depth in the product For products which consist of a coating to be irradiated, which may also be a pressure-sensitive adhesive, and a radiation-degradable backing, it is known to optimize the acceleration voltage. In this case the backing receives a significantly lower average dose than does the coating, while the dose reduction in the coating is still within an acceptable range for uniform crosslinking (Karmann, 7th Munich Adhesives and Finishing Seminar,1982; EP 0 453 254 (Yarosso et al.)).

In cable bandaging applications in the engine compartments of motor vehicles, based on adhesive tapes having a woven or nonwoven backing, petrol or diesel starts to dissolve the adhesive composition, as a result of which some of the adhesive composition migrates to the outside of the backing. Consequently, the cable bandaging becomes tacky on the outside and over time takes on considerable amounts of dirt.

The migration of partially dissolved adhesive composition to the other side of the backing can be suppressed by subjecting the adhesive composition to a high degree of crosslinking. As already mentioned, however, a degree of crosslinking which leads to sufficient insolubility in many cases entails inadequate bond strengths and unwind forces which do not meet the requirements of the application.

In practice, this deficiency is removed by the backing, in a first operation, receiving a coating which is highly crosslinked and so protects against the backing-side penetration of solvents, and by applying, in a second operation, a second layer of composition whose adhesion properties can be adjusted to the desired level by means of a freely selectable crosslinking. The crosslinking in this case is conducted, inter alia, with the aid of UV or electron beams. With the aid of crosslinking promoters, which are preferably added to the composition close to the backing, it is possible to ensure that the layer of composition close to the backing is crosslinked to a much higher degree, at a given UV or electron beam dose, than is the outer layer of composition. Radiation crosslinking can then be carried out in one pass for both compositions together.

Alternatively, the product properties can be adjusted if a first coating with subsequent irradiation at relatively high intensity is followed by a second coating with subsequent irradiation at lower intensity in one operation.

Both variants are extremely laborious and costly. Manufacture in one operation with two applicator units in series and a downstream irradiation unit, the first applicator unit applying a composition to which UV/EBC promoters have been added and the composition used in the second applicator unit lacking UV/EBC promoters, is highly demanding in terms of formulation and is virtually impossible to adapt to the planned applications.

A further disadvantage is that the radiation enters into the adhesive system from the side which is to be less highly crosslinked than the side facing the backing.

One example of an adhesive tape, based on a woven, for bandaging cable harnesses is disclosed in DE 44 19 169. The backing employed in this case is an open woven backing which is treated with inorganic phosphates or hydroxides and, if desired, with a coating material on the rear side. Coated onto the backing is a polar self-adhesive composition, treated with inorganic phosphates or hydroxides, which is of the acrylate or modified-rubber type and exhibits low solubility in nonpolar liquids.

The object of the invention is to remedy this situation and, in particular, to provide a process in which the disadvantages of the prior art are not present, or at least not to the same extent.

This object is achieved by a process as characterized more closely in the main claim. The subclaims describe advantageous embodiments of the process. Also embraced by the concept of the invention are adhesive tapes produced by the process of the invention, and the use of these adhesive tapes.

The invention accordingly provides a process for the radiation crosslinking of adhesive tapes coated on one side with an adhesive composition, the irradiation of the adhesive tape taking place through the backing material of the adhesive tape onto the adhesive composition in such a way that the backing material and that side of the adhesive composition facing the backing material receive a dose of from 30 to 200 kGy, in particular from 50 to 150 kGy, and, very particularly, 100 kGy, and the acceleration voltage during the irradiation being chosen such that the dose on the open side of the adhesive composition has fallen from 0 to 60 kGy, in particular from 0 to 50 kGy, and very particularly, from 10 to 20 kGy.

By this means it is ensured that, as a result of the high degree of crosslinking of the layer of composition on the side facing the backing, the migration of components of the composition to the open backing side cannot take place, while the adhesive properties of the tape are adjusted by way of the crosslinking in the region of the open composition side and also by way of the depth-related reduction in electron beam dose in the product.

The adhesive compositions employed are preferably acrylates, natural rubber systems, styrene block copolymers such as styrene-butadiene-styrene, styrene-isoprene-styrene or styrene-ethylene-butylene-styrene, in combination with tackifiers, from solution, from dispersion, or in the form of a hot melt.

In addition, the adhesive compositions can be filled, coloured and/or foamed.

Preference is also given to open backing materials such as, for example, nonwovens, spunbondeds or wovens made from PP, PE, polyester, or other polymers or copolymers customary for the application. The woven backing is, in particular, a viscose staple woven or cotton woven, or a polyester woven.

The process of the invention permits, inter alia, the cost-effective production of an adhesive tape having a woven or nonwoven backing for cable bandaging applications or for applications in engine compartments in motor vehicles, which suffers no adverse consequences whatsoever from petrol or diesel fumes.

With the controlled establishment of a dose gradient on the open side of the adhesive composition, it is possible to establish product properties such as, for example, solvent insensitivity and adhesion properties independently of one another.

The intention of the text below is to illustrate processes of the invention and adhesive tapes produced by the process of the invention, on the basis of a number of examples, without, however, wishing thereby unnecessarily to restrict the invention.

EXAMPLES

Example 1

A customary natural rubber solvent composition consisting of rubber, a resin combination comprising aromatic and aliphatic hydrocarbon resins and natural resins in combination with fillers and ageing stabilizers in petroleum spirit, is applied continuously using a coating bar in a continuous coat with a thickness of 100 g/m$^2$ to a polyester woven having a thread count of 20 threads/cm warp and 22 threads/cm welt, a thickness of 300 µm and a tensile strength of >150 N/cm.

Technical conditions:

Machine: curtain coater

Applicator unit: coating bar

Backing web speed: 50 m/min

The coated woven is subsequently dried thermally:

| Drying temperatures: | predrier | 1: 20° C. |
|---|---|---|
| | | 2: 25° C. |
| | | zone 1: 30° C. |
| | | zone 2: 45° C. |
| | | zone 3: 55° C. |
| | | zone 4: 55° C. |
| | | zone 5: 55° C. |
| | | zone 6: 50° C. |
| | | cooling zone: 45° C. |

Drying is followed by irradiation on the backing side (unit from the company Polymerphysik) at a dose of 100 kGy with an acceleration voltage of 200 kV.

After it has been bandaged round a test specimen and stored for 24 hours in diesel fuel, the resulting product is found to be resistant. There is no partial dissolution and subsequent passage of the adhesive composition through the open-pored backing material.

An alternative production process using 250 kV, with the other parameters unchanged, gave bond strengths and unwind forces which were too low for application as a cable bandaging tape. A further alternative production process at 150 kV gave inadequate resistance to diesel fuel and other fluids commonly present in the engine compartment.

Example 2

A polyester woven was coated as in Example 1 with a natural rubber adhesive composition and was irradiated from the backing side or the composition side at different acceleration voltages but at a constant electron beam dose of 100 kGy on the surface.

Table 1 shows the adhesives data measured as a function of the irradiation parameters.

TABLE 1

| | | Adhesives data as a function of irradiation parameters | | | | | | | | | |
|---|---|---|---|---|---|---|---|---|---|---|---|
| | | Adhesives data | | | | | | | | | |
| Irradiation: | | Backing side | Backing side | Backing side | Backing side | Backing side | Backing side | Backing side | Backing side | Backing side | Composition side |
| | | Virgin values (without storage): | | | | | | | | | |
| [kV] | | 150 | 160 | 170 | 180 | 190 | 200 | 210 | 220 | 230 | 230 |
| [kGy] | | 100 | 100 | 100 | 100 | 100 | 100 | 100 | 100 | 100 | 100 |
| UF 0.3 m/min | N/cm | 1.69 | 1.46 | 1.51 | 1.66 | 1.44 | 1.59 | 1.00 | 0.70 | 0.80 | 0.5 |
| BS/steel | N/cm | 3.46 | 3.39 | 2.92 | 2.99 | 3.30 | 3.07 | 3.00 | 3.20 | 3.00 | 2.66 |

TABLE 1-continued

Adhesives data as a function of irradiation parameters
Adhesives data

| Irradiation: | | Backing side | Backing side | Backing side | Backing side | Backing side | Backing side | Backing side | Backing side | Backing side | Composition side |
|---|---|---|---|---|---|---|---|---|---|---|---|
| BS/reverse | N/cm | 1.61 | 1.55 | 1.79 | 1.32 | 1.2 | 1.19 | 1.1 | 0.8 | 0.85 | 0.74 |
| | | | | | After storage 1 month/room temperature: | | | | | | |
| kV | | 150 | 160 | 170 | 180 | 190 | 200 | 210 | 220 | 230 | 230 |
| kGy | | 100 | 100 | 100 | 100 | 100 | 100 | 100 | 100 | 100 | 100 |
| UF 0.3 m/min | N/cm | 2.69 | 3.35 | 3.65 | 4.27 | 2.96 | 2.52 | 1.09 | 0.84 | 0.84 | 0.55 |
| BS/steel | N/cm | 3.7 | 3.5 | 2.8 | 2.9 | 3.5 | 3.2 | 3.2 | 3.58 | 3.2 | 2.63 |
| BS/reverse | N/cm | 1.6 | 2 | 2.1 | 1.7 | 1.3 | 1.5 | 1.22 | 1.46 | 1.19 | 0.60 |
| | | | | | After storage 1 month/+40° C. | | | | | | |
| [kV] | | 150 | 160 | 170 | 180 | 190 | 200 | 210 | 220 | 230 | 230 |
| [kGy] | | 100 | 100 | 100 | 100 | 100 | 100 | 100 | 100 | 100 | 100 |
| UF 0.3 m/min | N/cm | 1.72 | 2.14 | 1.62 | 1.87 | 1.95 | 1.8 | 1.2 | 0.78 | 0.76 | 0.53 |
| BS/steel | N/cm | 3.8 | 3.6 | 3.3 | 3.1 | 3.2 | 3.1 | 2.97 | 3.2 | 3.14 | 2.80 |
| BS/reverse | N/cm | 1.8 | 1.7 | 1.4 | 1.4 | 1.4 | 1.3 | 1.24 | 1.26 | 1.10 | 0.82 |

UF: unwind force
BS: bond strength

All samples were measured for their resistance to solvents common in the automotive sector by carefully bandaging copper wires with the adhesive tape and then subjecting them to storage in various solvents for 6 minutes or 24 hours. The results are summarized in Table 2.

TABLE 2

Resistance of the adhesive tape samples to solvents common in the automotive sector

| Resistance in | A: | B: | C: | D: | E: | F: | G: |
|---|---|---|---|---|---|---|---|
| test fluids | 150 kV | 160 kV | 170 kV | 180 kV | 190 kV | 200 kV | 200 kV composition side |
| | 100 kGy | 100 kGy | 100 kGy | 100 kGy | 100 kGy | 100 kGy | 100 kGy |
| 6 min diesel fuel | + | + | + | + | + | + | + |
| 24 h diesel fuel | − | − | − | ○ | ○ | + | − |
| 6 min ASTM oil | + | + | + | + | + | + | + |
| 24 h ASTM oil | − | − | ○ | ○ | ○ | + | − |
| 6 min brake fluid | − | − | ○ | + | + | + | − |
| 24 h brake fluid | − | − | ○ | ○ | + | + | − |

Assessment of the bandaged copper wires:
+: resistant
No emergence of adhesive composition:
○: still acceptable
−: not resistant
Emergence of partially dissolved adhesive composition In the case of open wovens and nonwovens, there is deliberate utilization of the effect that the dose reduction on the open composition side has a structure which comes about as a result of the fact that the electron beam was required to pass through no, one, two or more threads of the backing. On the open composition side, relatively highly crosslinked islands surrounded by less crosslinked areas are formed.

Example 3

A customary natural rubber solvent composition consisting of rubber, a resin combination comprising aromatic and aliphatic hydrocarbon resins and natural resins in combination with fillers and ageing stabilizers in petroleum spirit, is admixed with 1% trimethylolpropane triacrylate (based on the solids content) and is then applied continuously using a coating bar in a continuous coat with a thickness of 40 g/m² to a polyester woven having a thread count of 20 threads/cm warp and 22 threads/cm weft, a thickness of 300 μm and a tensile strength of >150 N/cm.

Technical conditions:
  Machine: curtain coater
  Applicator unit: coating bar
  Backing web speed: 50 m/min
The coated woven is subsequently dried thermally:

Drying temperatures:   predrier   1: 20° C.
                                  2: 25° C.
                            zone 1: 30° C.
                            zone 2: 45° C.
                            zone 3: 55° C.
                            zone 4: 55° C.
                            zone 5: 55° C.

-continued zone 6: 50° C.
cooling zone: 45° C.

Drying is followed by irradiation on the backing side at a dose of 100 kGy with an acceleration voltage of 150 kV.

After it has been bandaged round a test specimen and stored for 24 hours in diesel fuel, the resulting product is found to be resistant. There is no partial dissolution of the adhesive composition, associated with subsequent migration. The resulting product shows properties which are in accordance with requirements in respect, in particular, of bond strength and unwind force for the application as a cable bandaging tape for the automotive industry. An alternative manufacturing process with an acceleration voltage of 200 kV resulted in inadequate bond strengths and unwind forces.

What is claimed is:

1. Process for producing adhesive tapes, in which adhesive tapes coated on one side with an adhesive composition are subjected to radiation crosslinking, the irradiation of the adhesive tape taking place through the backing material of the adhesive tape into the adhesive composition in such a way that the backing material and that side of the adhesive composition facing the backing material receive a dose of from 30 to 200 kGy, and adjusting an acceleration voltage during the irradiation to create a dosage gradient through the adhesive tape such that the dose received on the open side of the adhesive composition has fallen to a range of from 0 to 20 kGy.

2. Process according to claim 1, wherein the adhesive compositions employed are selected from the group consisting of acrylates, natural rubber systems and styrene block copolymers, in combination with tackifiers from solution, from dispersion, or in the form of a hot melt.

3. Process according to claim 1, wherein the adhesive compositions are filled, coloured, foamed or a combination thereof.

4. Process according to claim 1, wherein open backing materials are employed.

5. Single-sided adhesive tape produced according to the process of claim 1.

6. A method for bandaging cables, which comprises bandaging said cables with a cable bandage tape prepared by the process of claim 1.

* * * * *

UNITED STATES PATENT AND TRADEMARK OFFICE
CERTIFICATE OF CORRECTION

PATENT NO. : 6,284,328 B1
DATED : September 4, 2001
INVENTOR(S) : Heiko Leydecker It is certified that error appears in the above-identified patent and that said Letters Patent is hereby corrected as shown below:

Title page, Item [54] and Column 1, line 6,
After "RADIATION CROSSLINKING, add -- AND USE OF THESE TAPES --

Column 8,
Line 2, change "adjusting an acceleration" to -- adjusting the acceleration --

Signed and Sealed this

Fifteenth Day of April, 2003

JAMES E. ROGAN
*Director of the United States Patent and Trademark Office*